Oct. 20, 1953   R. NAGY ET AL   2,656,320
ZINC SILICATE PHOSPHOR
Filed May 12, 1948
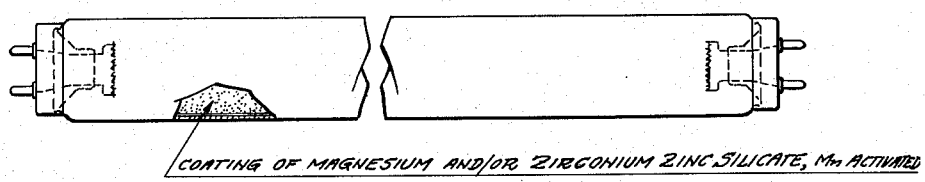
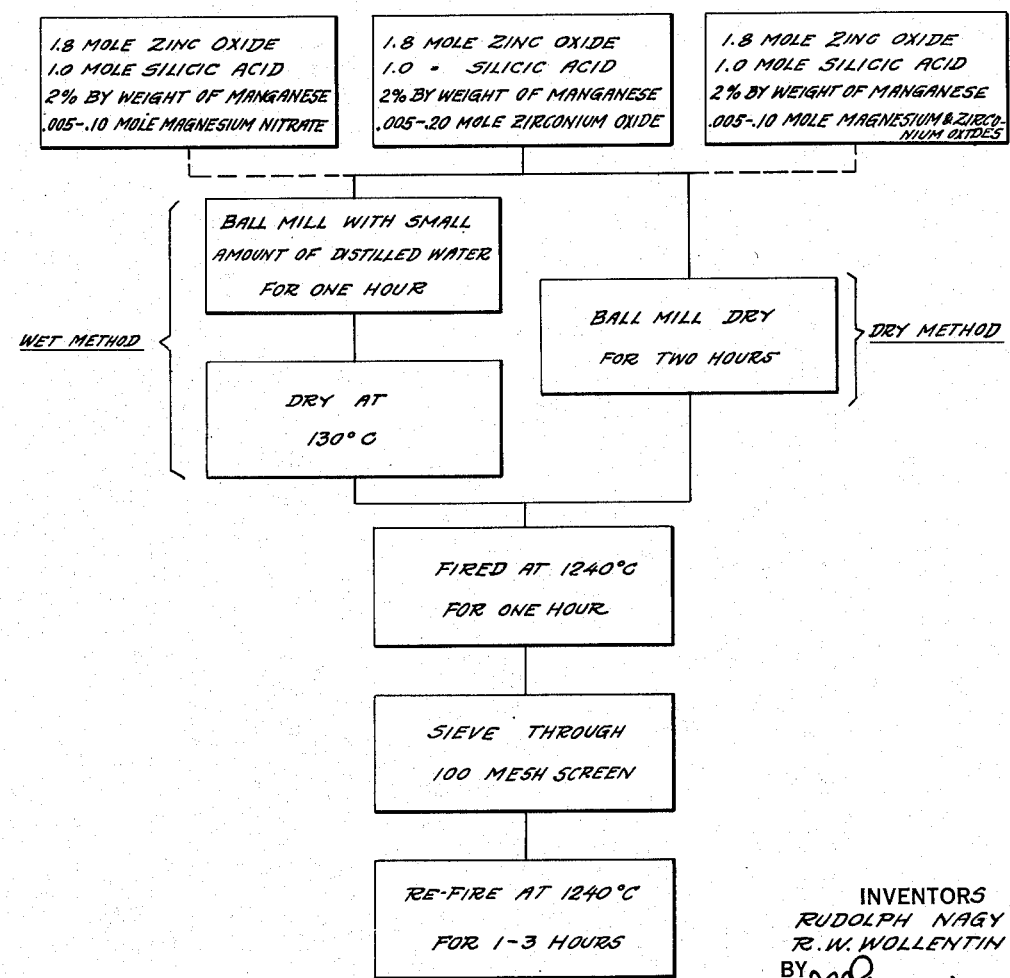
INVENTORS
RUDOLPH NAGY
R. W. WOLLENTIN.
BY
ATTORNEY Patented Oct. 20, 1953

2,656,320

UNITED STATES PATENT OFFICE 2,656,320

ZINC SILICATE PHOSPHOR

Rudolph Nagy and Robert W. Wollentin, Bloomfield, N. J., assignors to Westinghouse Electric Corporation, East Pittsburgh, Pa., a corporation of Pennsylvania Application May 12, 1948, Serial No. 26,488

18 Claims. (Cl. 252—301.6)

This invention relates to phosphors and methods of making, and more particularly to a zinc silicate phosphor having increased efficiency and improved maintenance.

The principal object of our invention, generally considered, is to produce a high-output zinc silicate phosphor by activation with magnesium and/or zirconium and manganese.

Another object of our invention is to produce a manganese-activated zinc magnesium silicate phosphor.

A further object of our invention is to produce a manganese-activated zinc zirconium silicate phosphor.

Other objects and advantages of the invention will become apparent as the description proceeds.

Referring to the drawing,

Figure 1 is an elevational view, with a part in longitudinal section, of a fluorescent lamp embodying our invention.

Figure 2 is a flow diagram illustrating embodiments of our method.

The usual method of preparing zinc silicate phosphor for fluorescent lamps is to mix zinc oxide and silicic acid in a ratio of about 1.2 to 1.0 mole, add about 1% of manganese in the form of the carbonate, and heat at a temperature of about 1280° C. A phosphor so produced and incorporated in a 40 watt fluorescent lamp, as an example, initially gives an output of about 90 lumens per watt, and after 100 hours burning the output has dropped to about 75 lumens per watt.

In accordance with our invention to be now described, we have been able to initially obtain 102.6 lumens per watt and 90.9 lumens per watt after 100 hours burning, with a lamp as illustrated in Figure 1. It will thus be seen that we not only initially obtain increased output, but the maintenance of lamps using our new phosphor is improved.

A preferred method of preparing our phosphor is to use magnesium as an activator, along with manganese, in a zinc silicate which may be considered as approximating the ortho-silicate, as distinguished from the former silicate approximating the metasilicate. However, it is desirable to have a slight excess of silicic acid over the theoretical zinc ortho-silicate $Zn_2SiO_4$. A preferred formula is approximately as follows:

1.8 moles zinc oxide (phosphor grade)
1.0 mole silicic acid (phosphor grade)
.078 mole manganese (preferably as the carbonate which may be expressed as 2% by weight)
.0135 mole magnesium (preferably as the nitrate)

The ingredients are desirably ball-milled together for one hour with a small amount of distilled water, dehydrated at about 130° C., and then heated at about 1240° C. for about one hour. They are then put through a desirably 100 mesh screen, and refired for from one to three hours, as represented in Figure 2, until there is no change in the output as determined by measuring a small plaque of the phosphor.

The mole proportion of the magnesium salt in the silicate, which may be the nitrate, carbonate, hydroxide, any known compound readily decomposable to the oxide, or the oxide itself, can be varied between the limits of .005 mole and .10 mole, for mono-magnesium compounds, and varied, if other compounds are employed, to give corresponding proportions of magnesium within the scope of our invention. However, we prefer to use the mole proportion given in the above formula, or one within the optimum range between .012 and .015 mole. Instead of manganese carbonate, we can use the silicate, an oxide, or any known manganese compound readily decomposable to the oxide in mole proportion to give a corresponding amount of manganese.

As an alternative, we may activate zinc silicate by zirconium, as well as manganese, using the same procedure as for magnesium, except that desirably about .02 mole of zirconium oxide are used in place of the magnesium salt. The range of concentration of zirconium compounds, in which desired activation can be obtained, is between .005 and .2 mole. With such a formula, we have initially obtained 99.2 lumens per watt using zirconium as an activator, and 88.8 lumens per watt after burning 100 hours, which is considerably better than the regular manganese-activated zinc silicate.

As a third alternative, we may activate with both magnesium and zirconium, as well as manganese, within the limits .005 to .10 mole of the magnesium and zirconium ingredients aggregated in any proportion, in accordance with the flow diagram of Figure 2. A typical formula would thus be approximately as follows:

1.8 moles zinc oxide (phosphor grade)
1.0 mole silicic acid (phosphor grade)
.078 mole manganese (preferably as the carbonate which may be expressed as 2% by weight)

Between .005 and .10 mole magnesium (preferably as the nitrate) mixed in any proportion with zirconium oxide.

Instead of the wet method of mixing, we may substitute the dry method comprising ball-mixing the dry ingredients for two hours, firing at about 1240° C. for about one hour, sieving through a desirably 100 mesh screen, and refiring at about 1240° C. for from about one to three hours.

From the foregoing, it will be seen that we have produced an improved manganese-activated zinc silicate, additionally activated with magnesium and/or zirconium, and giving a high output with improved stability. Although preferred embodiments of our invention have been disclosed, it will be understood that modifications may be made within the spirit and scope of the appended claims.

We claim:

1. A manganese-activated zinc silicate phosphor for fluorescent lamps additionally activated by one of the elements selected from the group consisting of magnesium and zirconium in mole proportions about .005 to .10 and about .005 to .20, respectively.

2. A manganese-activated zinc silicate phosphor for fluorescent lamps additionally activated by between about .005 and .10 mole of magnesium.

3. A manganese-activated zinc silicate phosphor for fluorescent lamps additionally activated by between about .005 and .20 mole of zirconium.

4. A manganese-activated zinc silicate phosphor for fluorescent lamps additionally activated by one of the elements selected from the group consisting of magnesium and zirconium in mole proportions about .012 to .015 and about .02, respectively.

5. A zinc silicate phosphor for fluorescent lamps, approximating the orthosilicate, and activated per mole by between about .012 and .015 mole of magnesium and about .078 mole of manganese.

6. A zinc silicate phosphor for fluorescent lamps, approximating the orthosilicate, and activated per mole by about .0135 mole of magnesium and about .078 mole of manganese.

7. A zinc silicate phosphor for fluorescent lamps, approximating the orthosilicate, and activated per mole by between about .005 and .2 mole of zirconium, and about .078 mole manganese.

8. A zinc silicate phosphor for fluorescent lamps, approximating the orthosilicate, and activated per mole by about .02 mole of zirconium and about .078 mole of manganese.

9. A phosphor for fluorescent lamps comprising the fired reaction product of the following raw material constituents in about the stated proportions: zinc oxide, 1.8 moles; silicic acid, 1.0 mole; a magnesium compound such as the oxide, or decomposable thereto, and equivalent in magnesium content to .0135 mole of the nitrate; and manganese, .078 mole.

10. A phosphor for fluorescent lamps comprising the fired reaction product of the following raw material constituents in about the stated proportions: zinc oxide, 1.78 moles; silicic acid, 1.0 mole; zirconium oxide, .02 mole; and manganese, .078 mole.

11. The method of making a zinc silicate phosphor having increased efficiency and improved maintenance, comprising grinding together zinc oxide, silicic acid, manganese carbonate, and magnesium nitrate with a small amount of distilled water for about one hour, drying at about 130° C., firing at about 1240° C. for about one hour, sieving through a preferably 100 mesh screen, and refiring at about 1240° C. for from one to three hours.

12. The method of making a zinc silicate phosphor having increased efficiency and improved maintenance, comprising grinding together zinc oxide, silicic acid, manganous carbonate, and zirconium oxide with a small amount of distilled water for about one hour, drying at about 130° C., firing at about 1240° C. for about one hour, sieving through a preferably 100 mesh screen, and refiring at about 1240° C. for from one to three hours.

13. The method of making a zinc silicate phosphor having increased efficiency and an improved maintenance, comprising grinding together zinc oxide, silicic acid, manganese carbonate, zirconium oxide, and magnesium nitrate with a small amount of distilled water for about one hour, drying at about 130° C., firing at about 1240° C. for about one hour, sieving through a preferably 100 mesh screen, and refiring at about 1240° C. for from one to three hours.

14. The method of making a zinc silicate phosphor having increased efficiency and improved maintenance comprising grinding together zinc oxide, silicic acid, manganese carbonate, and at least one of the materials selected from the group consisting of magnesium nitrate and zirconium oxide for about two hours, firing at about 1240° C. for about one hour, sieving through a preferably 100 mesh screen, and refiring at about 1240° C. for from one to three hours.

15. A zinc silicate phosphor for fluorescent lamps activated by about .078 mole of manganese and one of the elements selected from the group consisting of magnesium and zirconium in mole proportions about .005 to .10 and about .005 to .20, respectively.

16. A zinc silicate phosphor for fluorescent lamps activated by about .078 mole of manganese and between about .005 and .10 mole of magnesium.

17. A zinc silicate phosphor for fluorescent lamps activated by manganese and about .02 mole of zirconium.

18. A zinc silicate phosphor for fluorescent lamps activated by about .078 mole of manganese and one of the elements selected from the group consisting of magnesium and zirconium in mole proportions about .012 to .015 and about .02, respectively.

RUDOLPH NAGY.
ROBERT W. WOLLENTIN.

References Cited in the file of this patent

UNITED STATES PATENTS

| Number | Name | Date |
|---|---|---|
| 2,103,085 | McKeag | Dec. 21, 1937 |
| 2,212,209 | Leverenz | Aug. 20, 1940 |
| 2,314,699 | Hale | Mar. 23, 1943 |
| 2,447,448 | Williams | Aug. 17, 1948 |